June 27, 1961 T. AAMODT 2,989,784
METHOD OF FORMING A PLUG OF HIGH MELTING POINT
PLASTIC BONDED TO A LOW MELTING POINT PLASTIC
Filed Oct. 4, 1957 3 Sheets-Sheet 1

INVENTOR
T. AAMODT
BY
*W. O. Wright*
ATTORNEY

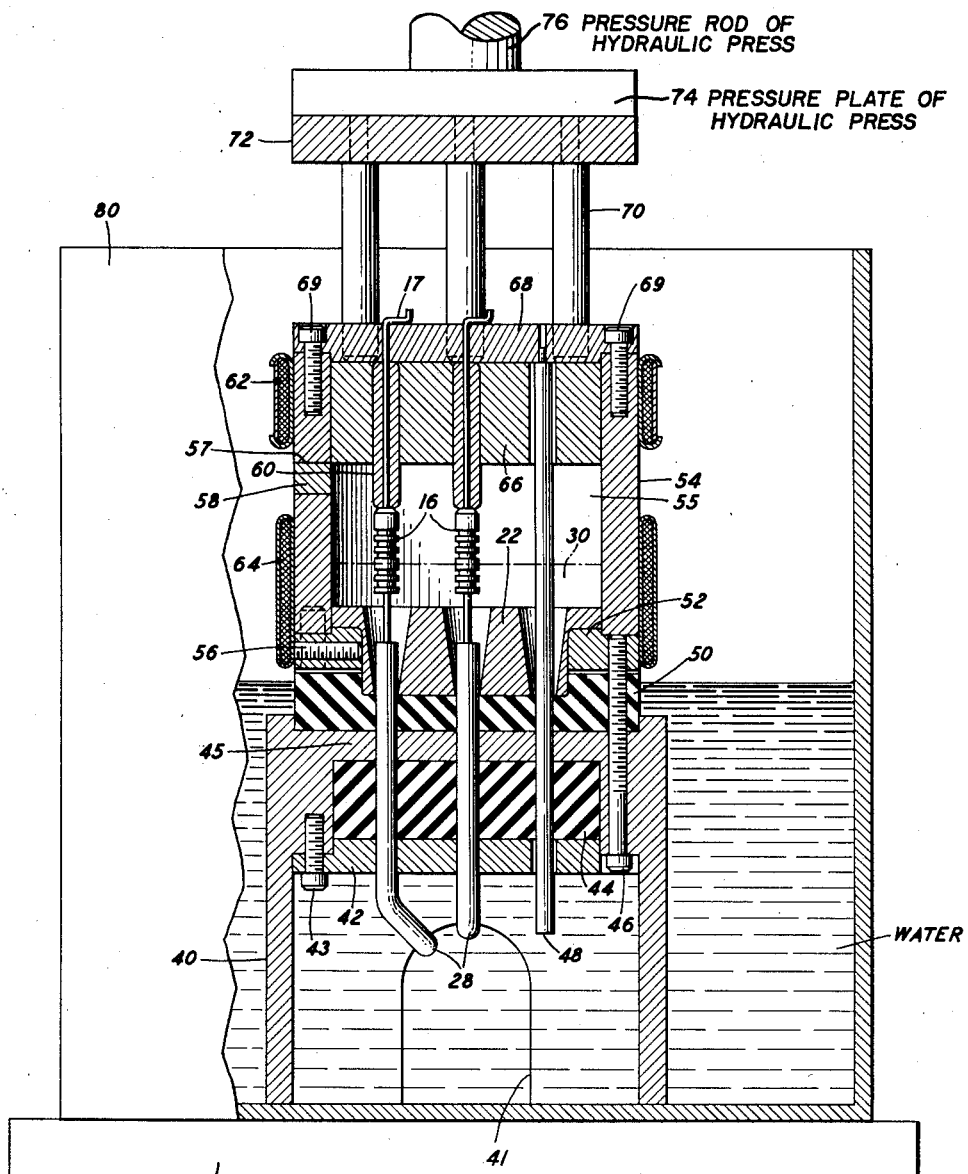

June 27, 1961 T. AAMODT 2,989,784
METHOD OF FORMING A PLUG OF HIGH MELTING POINT
PLASTIC BONDED TO A LOW MELTING POINT PLASTIC
Filed Oct. 4, 1957 3 Sheets-Sheet 3
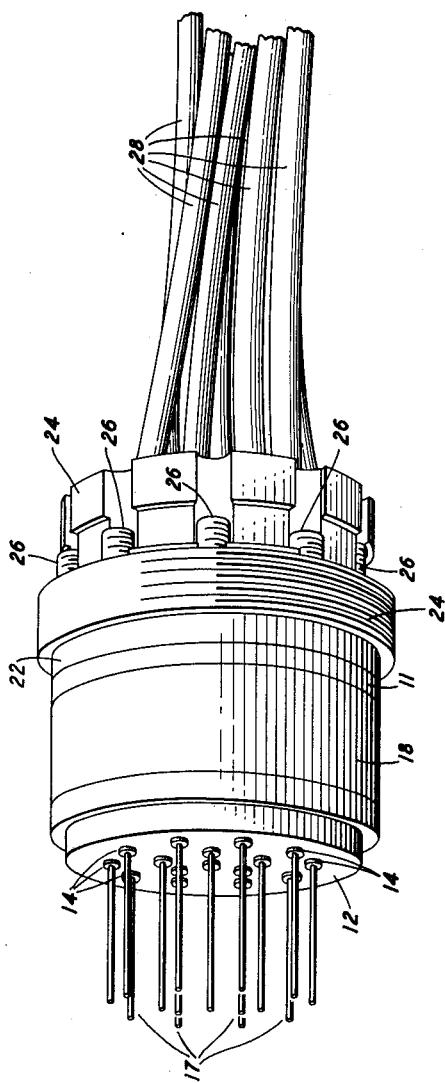
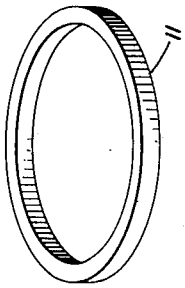
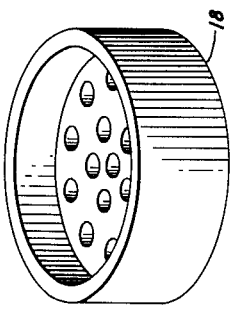
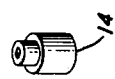
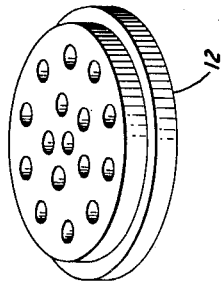
INVENTOR
T. AAMODT
BY
ATTORNEY

United States Patent Office 2,989,784
Patented June 27, 1961

2,989,784
METHOD OF FORMING A PLUG OF HIGH MELTING POINT PLASTIC BONDED TO A LOW MELTING POINT PLASTIC
Thoralf Aamodt, Liberty Corner, N.J., assignor to Bell Telephone Laboratories, Incorporated, New York, N.Y., a corporation of New York
Filed Oct. 4, 1957, Ser. No. 688,374
1 Claim. (Cl. 18—59)

This invention relates to a method of forming plastic seals. More particularly, it relates to seals involving the bonding of two plastics of substantially different melting temperatures.

The methods and arrangements of the invention, it should be understood, are applicable to the bonding of substantially any type of plastics together where one plastic has an appreciably higher melting point than the other.

An increasingly important group of plastics has been chosen for illustrative purposes in the present application. This group comprises those plastics known as ethylene polymers (polyethylenes). These are obtainable having densities varying over a range of approximately .90 to .98. Commercial polyethylene having a density of approximately .92 is admirably well suited for use as conductor insulation particularly since it is flexible at room temperatures, its mechanical and electrical properties are satisfactory for many uses, and it is readily extruded to cover the conductor. However, it is subject to cold flow under substantial pressure and hence it has been found extremely difficult to make high pressure seals involving the use of commercial polyethylene which will not develop leaks within a relatively short period of operation under high pressure.

Ethylene polymers having densities in the range of .94 to .98 have substantially increased stiffness, toughness and hardness, as well as substantially negligible cold flow, but are not suitable for general use as conductor insulation, or similar uses, since it are not sufficiently flexible at normal room temperatures and, furthermore, they are not readily extruded or otherwise conveniently applicable to conductors as insulation.

Since these higher density ethylene polymers have softening and melting temperatures substantially higher than the lower density commercial polyethylene, it has not heretofore been found practicable to fabricate assemblies in which the lower density commercial polyethylene conductor insulation is bonded to higher density ethylene polymers. Prior attempts to effect such a bond have resulted in objectionable deformation of the lower density material for a considerable distance from the areas at which the bond was being attempted. The higher density material could otherwise be advantageously employed, for example, to provide a portion of a high pressure seal, or for similar uses, since it would not develop leaks by cold flow of the material under pressure.

Higher density ethylene polymers are obtainable under various trade names such as "Marlex" and have been developed at several research laboratories including, for example, that of the Research Division of the Phillips Petroleum Company, as described in three articles appearing in "Industrial and Engineering Chemistry," volume 48, No. 7, for July, 1956, starting at pages 1152, 1155 and 1161, respectively. The titles of the above-mentioned three articles and their authors are, respectively, "Marlex Catalyst Systems" by A. Clark, J. P. Hogan, R. L. Banks and W. C. Lanning; "Properties of Marlex 50 Ethylene Polymer" by R. V. Jones and P. J. Boeke; and "Molecular Structure of Marlex Polymers" by D. C. Smith. Other publications of interest, including the more pertinent patents, are referred to in these articles.

The present application describes by way of specific illustrative embodiments of the principles of the invention a method for bonding the ends of the low density, commercial polyethylene conductor insulation to a plug of a higher density ethylene polymer which, as will become apparent, facilitates the fabrication of a high pressure, flow-free seal.

The method of the invention is based on the principle of maintaining an appropriate temperature gradient such that the application of a degree of heat to suitably soften the higher density material does not result in overheating the lower density material and the two materials can then be firmly bonded to each other without damage to the insulation of the conductors at or adjacent to the seal.

The method of the invention was developed in connection with the making of suitable high pressure seals for apparatus units employed as portions of submarine cable transmission links. These are, of course, subject to very high pressures in normal use. Numerous diverse and varied other applications of the principles of the invention will occur to those skilled in the art.

An object of the invention is to eliminate leakage in high pressure seals resulting from cold flow of plastic material involved in the making of the seal.

A further object of the invention is to make possible the firm bonding of a plastic having a high temperature melting point and one having a much lower temperature melting point.

Other and further objects, features and advantages of the invention will become apparent during the course of the following detailed description of illustrative embodiments of the invention and from the appended claim.

In the accompanying drawings:

FIG. 2 illustrates the mechanical features of an arrangement for effecting a tight bond between the ends of the low density polyethylene insulation of a plurality of conductors and a plug of a higher density ethylene polymer, in accordance with the principles of the invention;

FIG. 5 illustrates the subassembly which when appropriately installed in the end of the tubular loading coil case for which it is designed provides a seal of the invention;

FIG. 6 illustrates the form of steel backing plate employed in the subassembly of FIG. 5;

FIG. 7 illustrates the plastic bushings used in the backing plate of FIG. 6;

FIG. 8 illustrates the rubber gasket used in the subassembly of FIG. 5; and

FIG. 9 illustrates the steel restraining ring used in the subassembly of FIG. 5.

Figure 1:
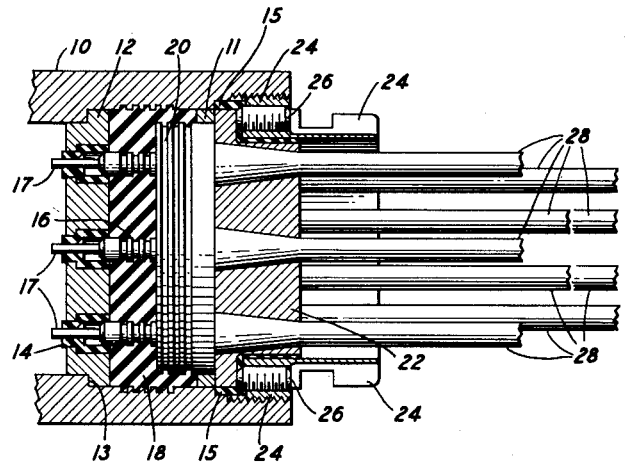
FIG. 1 illustrates in a cross-sectional view a seal assembly of the invention as installed in the end of a steel tubular loading coil case for use in conjunction with submarine cables.

In more detail in FIG. 1, housing 10 represents the end portion of a cylindrical steel housing intended to enclose and protect loading coils for loading the circuits of a submarine cable. In a typical case, the other end of the housing will be of similar construction so that the cable conductors will enter at one end, the loading coils will be connected in circuit with the conductors within the case, and the conductors will be brought out again at the other end of the steel housing. As a typical illustrative embodiment, the submarine cable may be considered to include a group of sixteen conductors 28, individually insulated by cylindrical polyethylene coatings applied in any of the manners well known and understood by those skilled in the art. The conductors, of course, when in service are enclosed within a composite sheath, not shown, designed to protect them from the numerous and varied hazards to which they may be subjected.

The end section of the cylindrical housing 10 is provided with a shoulder 13 against which the flanged periphery of steel backing plate 12 is designed to fit tightly, as shown.

Steel backing plate 12 has sixteen holes therein through which the uninsulated ends 17 of the sixteen conductors 28 may protrude, the cross-sectional view being taken in a plane such that three of the sixteen conductors are exposed.

Plastic bushings 14 are provided in each hole in the backing plate 12 to insulate the conductor ends from the backing plate. As shown, the left end of each hole is constricted, forming a shoulder against which a corresponding shoulder on each bushing 14 can press to withstand pressure exerted from the right.

As will be more clearly apparent in FIGS. 2, 3 and 4, the insulation is removed from each conductor and a grooved copper slug 16 is brazed to the conductor near its end for purposes which will be described in detail hereinunder.

A cup-shaped rubber gasket 18 is interposed between the steel backing plate 12 and the base plug 20 as shown, an accurately fitted steel restraining ring 11 being provided to prevent the thin edge of the open end of the rubber gasket from being extruded to the right.

A steel head-piece 22 provides a medium through which pressure toward the right may be exerted on base plug 20, restraining ring 11, and rubber gasket 18. A small amount of self-curing rubber compound 15 is injected around the left end of head-piece 22 as shown in FIG. 1 to fill the small clearance space around it and to prevent the penetration of moisture into the clearance space which would be likely to produce serious corrosion of the steel.

A steel clamping ring 24, one end of which is threaded to fit an internal thread on the right end of housing 10, is provided with several dozen set screws 26 uniformly spaced around its periphery. Pressure is exerted on the flanged left end of steel head-piece 22 by suitably tightening or setting up the set screws 26 after ring 24 has been assembled in housing 10.

The conductors (uninsulated left ends 17 and a small length of the ends of the insulated portions 28) extend through the seal assembly as indicated, the polyethylene insulation of the conductors forming a bond with the higher density ethylene polymer, of which base plug 20 consists, at a point intermediate the right and left ends of the conical holes provided in steel head-piece 22 for the conductors. (More clearly apparent in cross-sectional showings of FIGS. 3 and 4.)

The holes in head-piece 22 are conical in internal contour and are tapered to converge toward the right as shown. The wedging action exerted by these conical holes on the polymers tends to furnish such support that difficulties resulting from flow of the material will not be encountered. The higher density polymer will extend, in the usual case, substantially one-half to two-thirds of the way through the head-piece 22 from the left as indicated, for example, in FIG. 3. As stated hereinabove, the higher density polymers are substantially free from cold flow.

The uninsulated ends 17 of conductors 28 extend to the left beyond the bushings 14 in the backing plate 12 as shown in FIG. 1 and are intended to be connected appropriately to other conductors, not shown, leading to loading coils (also not shown) enclosed in housing 10.

In FIG. 2 an arrangement is illustrated by means of which the subassembly, comprising head-piece 22, conductors 17 bearing grooved slugs 16, and a plug 30 (readily machined to become the higher density polymer base plug 20 of FIG. 1) is completed by molding plug 30 and bonding it to the several ends of the insulation on the conductors 28. The subassembly is illustrated in FIG. 3, plug 30 being the plug as formed in the arrangements of FIG. 2. A small portion is broken away to show the bonding of the plug 30 to the insulation of a conductor.

A steel base 40 provides a rigid support capable of withstanding a very substantial downward force. In the upper end of base 40 a rubber washer 44 having holes through which the cable conductors 28 are to be threaded is arranged to be compressed by steel plug 42. After the conductors have been properly positioned in the arrangement of FIG. 2, plug 42 is drawn upward by a suitable plurality of bolts 43 distributed around the periphery of plug 42. The compressing of washer 44 effected by drawing bolts 43 tightly into place tends to clamp adjacent portions of conductors 28 firmly in position for the operation presently to be described. A lateral opening 41 in base 40 permits the other ends of the conductors 28 to extend from the base.

A heat insulating disc 50 is supported on an upper surface 45 of base 40 and protects the insulation of conductors 28 extending below it from heat applied above it, as will presently be described.

A hardened steel cylinder 54, including a mounting ring 52, is held tightly to base 40 by a suitable plurality of bolts 46 which extend through the disc 50 as indicated. Disc 50 can be of any reasonable tough, rigid material which will effectively prevent the transmission of heat. It can be, for example, of a compound including a high percentage of mica particles such as that obtainable under the trade name "Mycalex." Alternatively, various ceramic materials and compounds including a high percentage of asbestos particles can be used.

The lower end of cylindrical member 54, including ring 52, is shaped to accommodate head-piece 22 when assembled therein as shown in FIG. 2. The base ring 52 has a plurality of inwardly directed set screws 56. Set screws 56 are tightened to hold head-piece 22 firmly in place. Each conductor 28 is brought up through holes provided in plug 42, washer 44, surface 45, disc 50, and head-piece 22, as shown, the insulation being cut back from the upper end of each conductor so as to extend approximately to the midpoint of the cone-shaped holes through head-piece 22, the insulation entering from the smaller end of the cone-shaped hole as shown in FIG. 2. A top plate 68 held in position on the upper end of cylinder 54 has appropriately located holes through which the uninsulated end 17 of each of the conductors 28 may be drawn and thereafter sharply bent so as to hold the conductors in position under a moderate degree of tension.

Plunger 66 is likewise equipped with appropriately positioned holes to accommodate the uninsulated ends of the conductors, a spacing or centering sleeve 60 being placed on each conductor prior to passing it through a hole in the plunger 66.

A plurality of bolts 69 hold top plate 68 on cylinder 54.

Plunger 66 fits accurately, i.e. it has a sliding fit, with the inside of cylinder 54.

Figure 3:
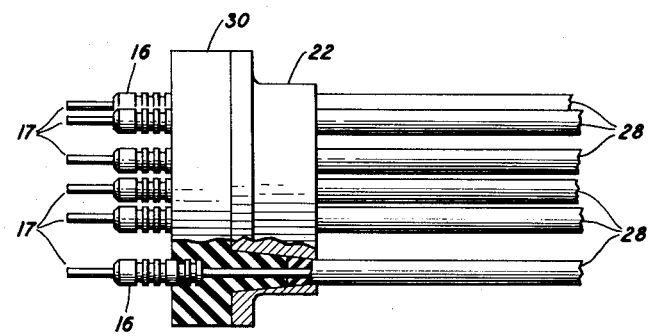
FIG. 3 illustrates in a partially cross-sectioned view the element produced by the use of the arrangement of FIG. 2.

A filling slot 57 is provided at the left side of cylinder 54, as shown, for inserting particles or pellets of the higher density ethylene polymer from which the base plug 30 of FIG. 3 is to be molded by the arrangement of FIG. 2, the material in pellet form substantially filling the cavity 55 in the cylinder 54 between the head-piece 22 and the plunger 66 with the plunger 66 drawn up into contact with top plate 68. After filling the cavity, a plug 58 is inserted to close the slot 57.

Because of the use of the top plate 68 to support the upper ends of conductors 17, downward vertical pressure is exerted upon plunger 66 by means of a suitable number of pressure plate pins 70 which extend through holes in top plate 68 and terminate in a pressure plate 72 at a suitable distance above the top plate 68, as shown.

The cylinder 54 and its contents may be heated by means of electrical heating coils 62 and 64 encircling cylinder 54 as indicated. The whole assembly is placed in a watertight vessel or tank 80 into which water is introduced until the water surface is within one-sixteenth of an inch of being level with the top of disc 50. The water is continuously changed, or circulated through an adequate reservoir (not shown), to keep it at substantially room temperature, or a somewhat lower temperature.

The problems sought to be overcome by the arrangement of FIG. 2, described in detail above, are to appropriately control the heating of the two plastics of highly divergent melting temperatures, i.e. the lower density polyethylene insulation of the conductors and the higher density ethylene polymer pellets which are formed into base plug 30; to avoid excessive shrinkage with possible voids either in the plug 30 or in the insulation surrounding the conductors 28; and to keep the polyethylene conductor insulation from being damaged by overheating in the bonding process. The cooling arrangements described, including the heat insulating disc 50 and the water circulated around the base 40, et cetera, effectively limit the heating of the wire insulation so that no appreciable deformation of the insulation takes place except in the immediate vicinity of the areas of bonding to the higher density material.

It should be noted that the arrangement of FIG. 2 is designed to operate on the pressure type molding principle as contrasted with the injection principle more commonly employed in making polyethylene elements. Pressure type molding has been resorted to for the purpose of minimizing shrinkage and voids in the molded parts.

The problem posed by the substantially differing melting temperatures of the two ethylene polymers is overcome, as mentioned above, by the introduction of a sharp heat gradient effected by the use of the insulating disc 50 inserted between the two principal sections of the mount, the one section containing the higher density ethylene polymer, and the other section containing mainly the polyethylene insulated wires and the water bath held to near the upper edge of disc 50 as described above.

As was also mentioned above, the rubber washer 44 is compressed by compression plug 42 after all wires have been assembled and tends to prevent damage to the wire insulation in the molding process by supporting the wires against the forces that are brought to bear on them when the molding is being done.

To facilitate the alignment of the various elements through which the wires must be threaded for the molding process as illustrated in FIG. 2, a guide rod 48 is preferably assembled in one of the outer positions while the conductors are being threaded through the remaining positions, the rod being withdrawn and the final conductor being inserted in its place to complete assembly of the conductors in the mount. The top plate 68 obviously is of considerable assistance in keeping the conductors in alignment during the molding process, the upper bare ends 17 of the conductors being pulled tight and crimped over the top of plate 68 as shown in FIG. 2.

Spacing sleeves 60 fit snugly in the holes in plunger 66 and guide the motion of the plunger when it is forced downward during the molding process.

Fusion or bonding of the higher density ethylene polymer to the polyethylene insulation on conductors 28 takes place in the conical openings through the head-piece 22, the higher density polymer compressing the insulation on the wires to an extent such that the polyethylene usually occupies somewhat less than one-half of the conical opening toward the smaller end of the opening.

It is, of course, between the head-piece and the remaining lower portions of the structure as illustrated in FIG. 2 that the sharp temperature gradient must be created in order to prevent excessive softening of the polyethylene insulation on the wires below the fusion or bonding area.

The heat insulating disc 50, of course, functions to insulate said lower portions of the arrangement of FIG. 2 from the higher temperatures existing at the upper side of disc 50 during the molding process. The grooved slugs 16 are so positioned that substantially a third of their length at the lower end is embedded in the plug 30 of higher density ethylene polymer for the principal purpose of excluding any moisture which might seep through the polyethylene insulation of conductors 28 on the lower (or outer) side of the seal. Such moisture could otherwise travel along the surface of the conductive wire and exude from the ends of the conductors inside the seal.

The heating and pressure cycle employed in molding plug 30, using the arrangement of FIG. 2, can be, by way of example, substantially as follows:

The arrangement of FIG. 2, as described in detail above, is placed in a hydraulic press represented by base plate 78 beneath tank 80, pressure plate 74 in contact with plate 72 and pressure rod 76, as shown in FIG. 2. As previously stated, a continuous flow of cooling water is maintained for tank 80. The desired water level is approximately one-sixteenth of an inch below the top of disc 50. Power is applied to the heating coils 62, 64 and a temperature within the mold cavity, as observed by means of an appropriate thermometric device, not shown, is reached before pressure is exerted on plate 72.

For the specific combination of plastics, i.e. commercial polyethylene and "Marlex," at 350 degrees Fahrenheit a force of about 500 pounds is applied on the pressure plate and maintained until a temperature of substantially 500 degrees Fahrenheit is reached. This is the peak or high point of the temperature cycle and power is removed from the heaters when this temperature is reached. Cooling is then accelerated by raising the water level in the reservoir tank 80 gradually, and as cooling takes place the force on plate 72 is gradually increased from 500 pounds to about 9,000 pounds at a rate such that the last mentioned force is applied at substantially the time at which room temperature has been reached. The increase of the molding force with the lowering of the temperature serves to eliminate voids and to decrease shrinkage of the molded parts to a minimum. The pressure is removed after room temperature has been reached.

The subassembly, comprising the steel head-piece 22, the base plug 30 of the higher density ethylene polymer, and the conductors 28, is then removed from the molding equipment of FIG. 2 and is in the form illustrated in FIG. 3. In FIG. 3 a small portion of the assembly is broken away to show the bonding of plug 30 to the insulation on a conductor 28.

Figure 4:
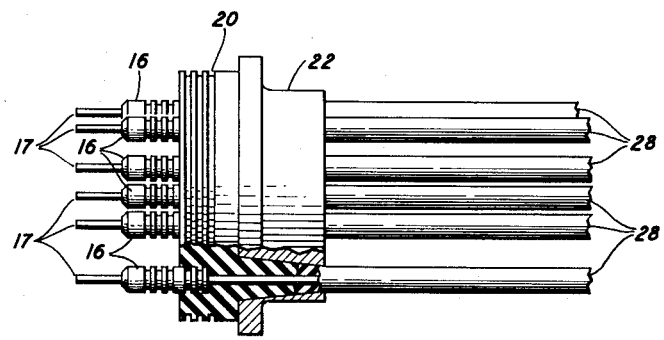
FIG. 4 illustrates in a partially cross-sectioned view the finishing of the element of FIG. 3 for use in the seal assembly of FIG. 1.

As shown in FIG. 3, the molded plug of higher density ethylene polymer, designated 30 in this figure, is of the same diameter as the adjacent flanged end of the steel head-piece 22 so that to adapt it for assembly in the completed seal of FIG. 1 it must be machined to the form as illustrated in FIG. 4, so that the steel restraining ring 11 of FIG. 1, shown in more detail in FIG. 9, will have a sliding fit between the machined plug 20 and the steel cylinder housing 10, as shown in FIG. 1. Transverse grooves, as shown, are cut on the left end of plug 20, in the copper slugs 16 mounted on the conductors, and on the internal surface of the steel cylindrical housing 10, i.e. along all lateral surfaces which will be in contact with the rubber gasket 18 as assembled in the completed seal of FIG. 1, for the purpose of interrupting any longitudinal scratches or faults in the surfaces which might develop leaks that would be extremely difficult to cure by any other means. Compression of rubber gasket 18 will force it to expand into these slots and decrease the likelihood of any leakage developing along these surfaces.

The steel backing plate 12 is shown in further detail in FIG. 6. The plastic bushings 14 are illustrated in FIG. 7 and the rubber gasket 18 is illustrated in FIG. 8.

The above-described arrangements are, of course, illustrative only. It should be expressly understood that the methods and principles of the invention are not limited to the use of ethylene polymers, many other plastics well known to those skilled in the art being entirely suitable for the practice of the invention. Numerous diverse and varied other arrangements clearly within the spirit and scope of the principles of the present invention will readily occur to persons skilled in the art. No attempt has been made to exhaustively cover all such possible arrangements.

What is claimed is:

The method of forming a plug of a high melting point insulating material and bonding the end of a low melting point insulation on each of a plurality of submarine cable conductors to the plug which comprises providing a steel headpiece having a like plurality of spaced holes therein, providing a heat shield adjacent a first side of the headpiece, the shield having a like plurality of spaced holes therein, extending the ends of the conductors through the spaced holes respectively in the shield and headpiece, the headpiece having a diameter equal to that of the plug and a thickness several times the diameter of the conductor insulation, each hole in the headpiece having a straight conical taper from a snug fit around the insulation at the first side of the headpiece to less than double this size at the other side, removing the insulation from the end of each conductor extending from the said other side of the headpiece to a point substantially midway through the headpiece, firmly supporting the insulation of each conductor in and adjacent to the outer side of the heat shield for a distance substantially twice the thickness of the headpiece, maintaining the temperature of the insulation of each conductor adjacent the outer side of the heat shield at substantially room temperature while forming the plug of high melting point insulating material under heat and pressure adjacent the other side of the headpiece, the forming temperature and pressure to which the plug is subjected being sufficient so that the high melting point insulation extends into and fills all space in each of the conical holes surrounding and adjacent to the conductor and the conductor insulation within the hole and bonds securely thereto, cooling the assembly to room temperature and simultaneously gradually increasing the pressure on the plug by directly acting rigid mechanical means as room temperature is approached to minimize shrinkage and voids in the high melting point insulation, and thereafter removing the pressure.

References Cited in the file of this patent

UNITED STATES PATENTS

| | | |
|---|---|---|
| 2,276,380 | English et al. | Mar. 17, 1942 |
| 2,444,075 | Violette | June 29, 1948 |
| 2,736,064 | Rubin | Feb. 28, 1956 |
| 2,827,618 | Chapman et al. | Mar. 18, 1958 |

FOREIGN PATENTS

| | | |
|---|---|---|
| 608,992 | Great Britain | Sept. 23, 1948 |
| 676,543 | Great Britain | July 30, 1952 |
| 704,352 | Great Britain | Feb. 17, 1954 |